United States Patent [19]

Raidel, II

[11] Patent Number: 4,741,553
[45] Date of Patent: May 3, 1988

[54] AIR RIDE TRAILING AXLE SUSPENSION WITH LEAF SPRING GUIDED DRIVE AXLE SUSPENSION AND LOAD EQUALIZATION

[76] Inventor: John E. Raidel, II, 4925 Royal Dr., Springfield, Mo. 65804

[21] Appl. No.: 686

[22] Filed: Jan. 5, 1987

[51] Int. Cl.⁴ .............................................. B60G 5/00
[52] U.S. Cl. .................................... 280/682; 280/686
[58] Field of Search ............... 280/680, 682, 686, 688, 280/712

[56] References Cited

U.S. PATENT DOCUMENTS

| | | | |
|---|---|---|---|
| 2,655,388 | 10/1953 | Nabors | 280/686 |
| 2,907,579 | 10/1959 | Masser | 280/686 |
| 3,246,911 | 4/1966 | Jurgens | 280/682 |
| 3,531,099 | 9/1970 | King | 280/712 |
| 4,033,606 | 7/1977 | Ward et al. | 280/682 |
| 4,131,297 | 12/1978 | Raidel | 280/682 |

*Primary Examiner*—Ross Weaver
*Attorney, Agent, or Firm*—Rogers, Howell, Moore & Haferkamp

[57] ABSTRACT

A suspension system including a leaf spring assembly associated with a forward vehicle axle and an air spring suspension assembly associated with a rear axle with an articulated connection between them, such as by way of a shackle. The air spring suspension assembly includes a rocker arm pivotally supported from the chassis. A torque rod and beam assembly is pivotally supported from the chassis and is connected to the axle. An air spring is mounted between the torque rod and beam assembly and a rocker arm. The rocker arm has angled sections allowing accommodation of either wide base or narrow base air spring positions. Other angled sections of the rocker arm position the mounting bushing generally on a line between the air spring and the shackle to center the load on the bushing.

19 Claims, 4 Drawing Sheets

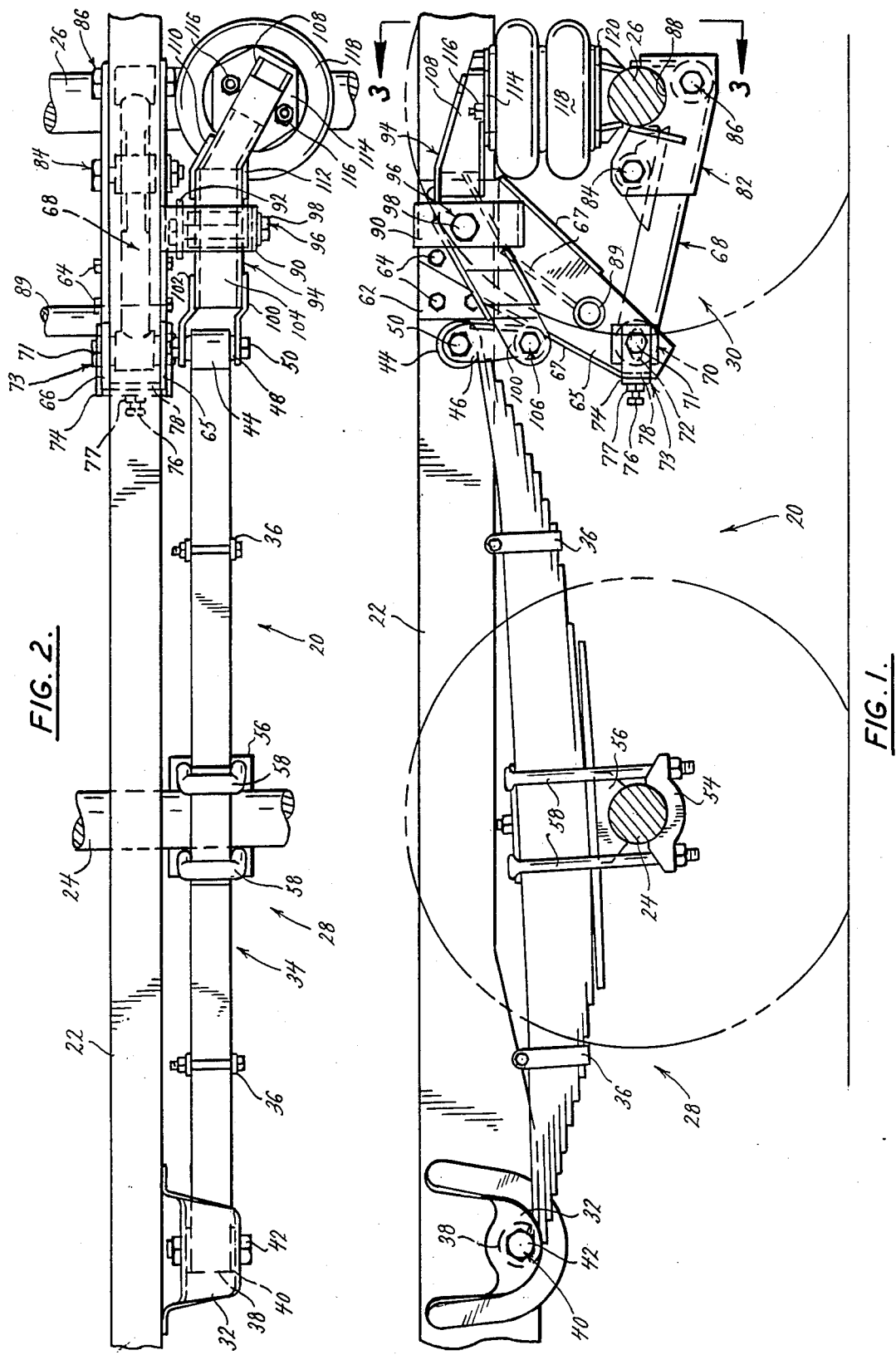

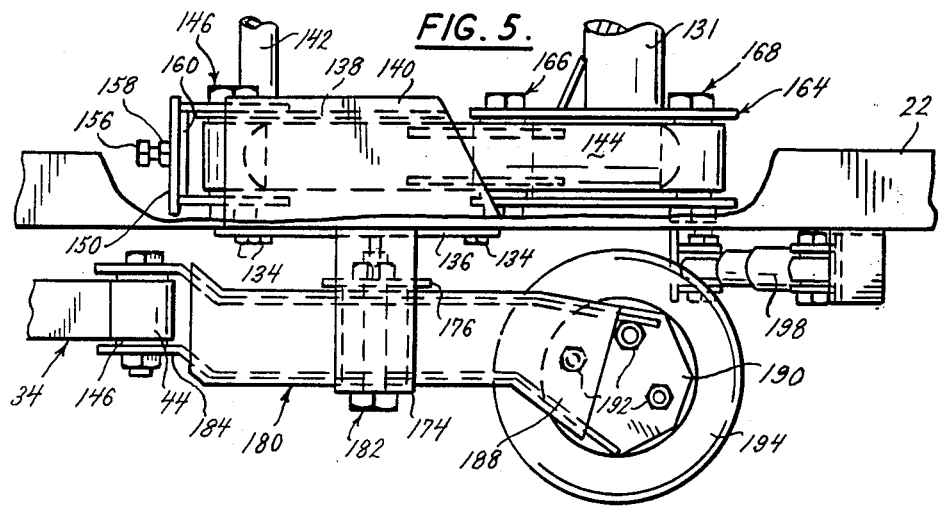
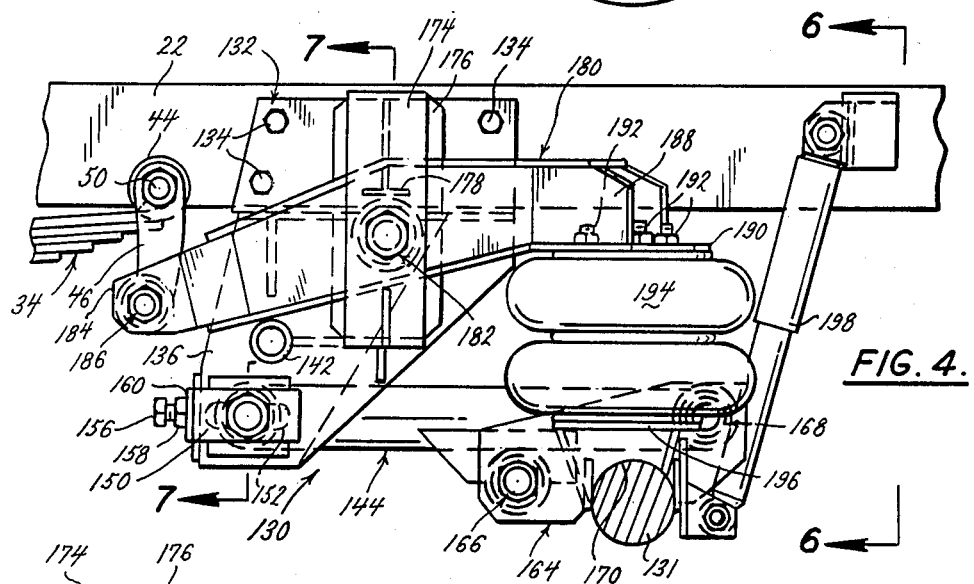
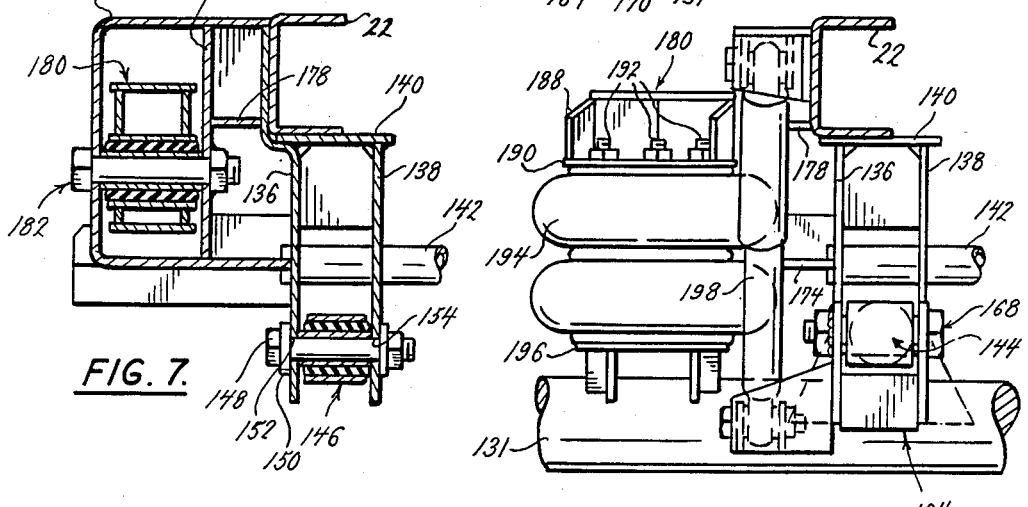

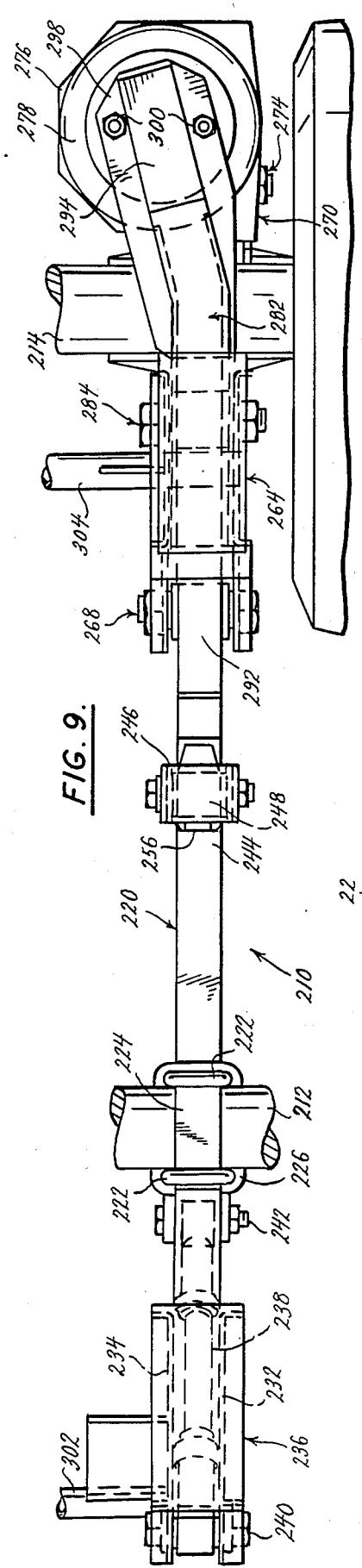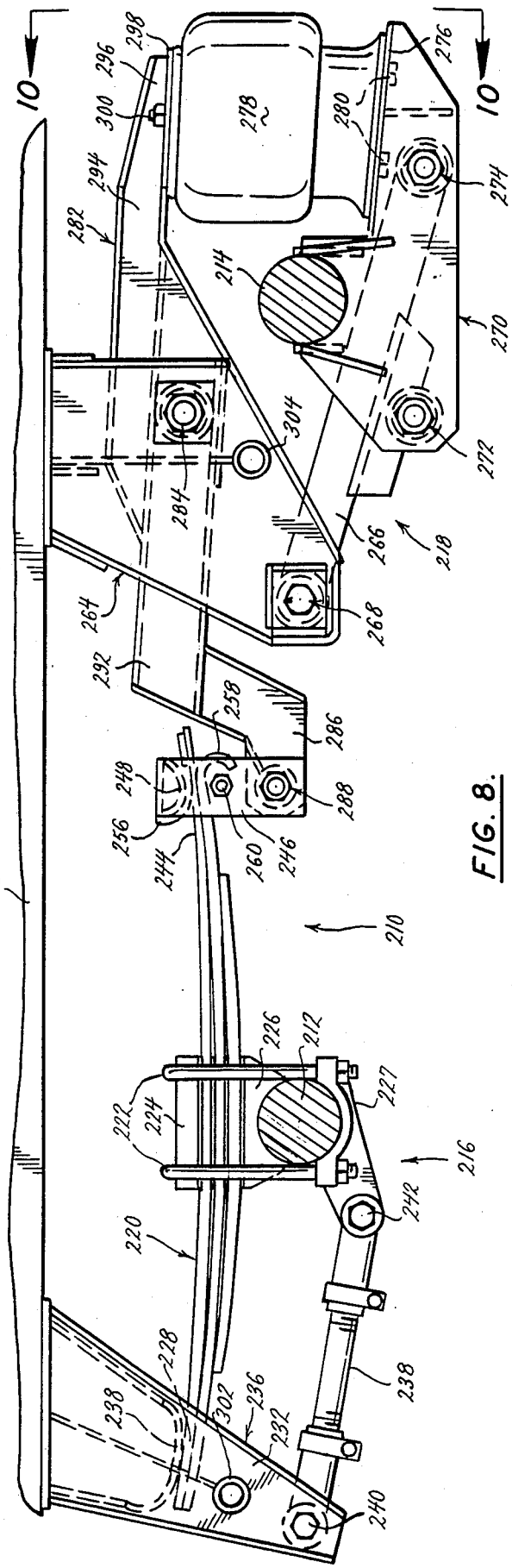
FIG. 9.
FIG. 8.

4,741,553

AIR RIDE TRAILING AXLE SUSPENSION WITH LEAF SPRING GUIDED DRIVE AXLE SUSPENSION AND LOAD EQUALIZATION

BACKGROUND OF THE INVENTION

This invention relates to a vehicle suspension system and particularly to the incorporation of an air ride suspension assembly for a trailing axle joined by a load equalizing shackle connection to a leaf spring guided drive axle suspension assembly.

Suspension systems of various kinds are disclosed in U.S. Pat. Nos. 4,371,189; 4,184,698; 4,131,297; 4,093,272; 3,801,086; and 3,614,123; and there are many other suspension systems that have been developed. However, none of these suspension systems incorporates the concepts of the present invention. This suspension system is set forth in the summary which follows:

SUMMARY OF THE INVENTION

This invention comprises an air spring suspension assembly that is combined with a leaf spring suspension assembly. The leaf spring suspension assembly is associated with a forward vehicle axle and the air spring suspension assembly is associated with a rearward axle of the vehicle. The air suspension assembly may be installed on the vehicle for cooperation with an existing leaf spring suspension assembly, or both the leaf spring and air spring suspension assemblies may be incorporated as new installation. In both cases, the leaf spring suspension assembly has a trailing end that is joined by an articulated connection to a leading end of the air spring suspension assembly through an articulated connection for load equalization.

The leaf spring suspension assembly includes a plurality of laminated leaf springs connected at their centers to the forward axle by a suitable clamping means. The forward end of the leaf spring assembly is connected to a hanger that depends from the chassis or bears against a wear plate on such a hanger. The rearward end of the leaf spring assembly is journalled through a bushing assembly to a shackle or is contained to bear against a wear plate on the shackle.

The shackle is also connected to the forward end of a rocker arm that is journalled within a bushing assembly mounted on a hanger. The hanger also supports a torque rod and beam assembly that is connected to the rearward axle. An air spring is mounted between the torque rod and beam assembly and the rearward end of the rocker arm. The relative positions of the shackle, the axles, and the other suspension assembly connections determine the desired axle load distribution.

This invention accommodates a wide base air spring installation as well as a narrow base air spring installation. It also accommodates both underslung and overslung connections to the trailing axle.

BRIEF DESCRIPTION OF THE DRAWINGS

FIG. 1 is a side elevation view of one embodiment of the suspension system of this invention;

FIG. 2 is a top plan view of the suspension system of FIG. 1;

FIG. 4 is a side elevation view of a modification of the suspension system of FIG. 1 adapted for mounting to a drop axle;

FIG. 5 is a top plan view of the suspension system of FIG. 4;

FIG. 6 is a view in section taken along the plane of the line 6—6 of FIG. 4;

FIG. 7 is a view in section taken along the plane of the line 7—7 of FIG. 4;

FIG. 8 is a side elevation view of another embodiment of the invention adapted to a narrow base installation;

FIG. 9 is a top plan view of the suspension system of FIG. 8; and

DETAILED DESCRIPTION OF THE PREFERRED EMBODIMENT

Figure 10:
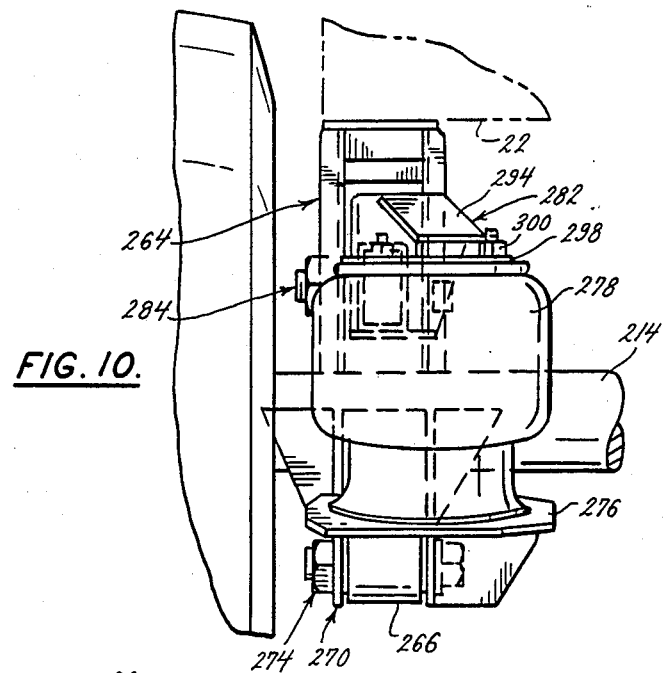
FIG. 10 is a view in section taken along the plane of the line 10—10 of FIG. 8.

Referring to FIG. 1, the suspension system 20 is adapted to be installed on opposite sides of a vehicle. Only the left suspension system 20 is shown and described since the right suspension system would be identical. The vehicle is of the kind having a left side rail 22 and forward and rearward axles 24 and 26.

The suspension system includes a leaf spring suspension assembly 28 associated with the forward axle 24 and an air suspension assembly 30 associated with the rearward axle 26 and can consist of both the forward and rearward suspension assemblies 28 and 30. However, a particular advantage of this invention is that the air suspension assembly 30 can be installed on a vehicle to replace the rearward assembly while the original or existing forward leaf spring suspension assembly 28 is retained.

A hanger 32 is joined to the side of the chassis frame member 22, such as by welding. A plurality of leaf springs forming a leaf spring assembly 34 are held together by spring clamps 36. The forward end 38 of the leaf spring assembly 34 is wrapped about a bushing assembly 40 that is held by a bolt 42 to the hanger 32. The other end 44 of the leaf spring assembly is pivotally connected to a shackle 46 such as on a bushing assembly 48 held in place by a bolt 50.

It should be understood that in a typical original or existing leaf spring suspension assembly, the trailing end 44 of the leaf spring assembly 34 normally would be supported by the vehicle chassis, such as by the shackle 46 being pivotally mounted in a suitable hanger that is joined to the frame member 22. However, in conjunction with installation of the air spring suspension assembly 30, the connection of the shackle to the chassis will have been released so the shackle 46 can be connected to the air spring suspension assembly 30 as will be described.

As is typical, an axle clamp comprised of blocks 54 and 56 is fastened to the forward axle 24 by suitable U-bolts 58. These U-bolts 58 are clamped about the central portion of the leaf spring assembly 34 intermediate the ends 40 and 44, as shown. As FIG. 2 illustrates, the leaf spring assembly 34 lies transversely outboard of the chassis rail frame member 22.

The suspension assembly 30 is supported by a hanger assembly 62 that in turn is fastened to the side frame member 22, such as by bolts 64. The hanger 62 includes a pair of side plates 65 and 66 that depend downwardly below the frame member 22 with appropriate reinforcing plates 67.

A torque beam assembly 68 is mounted on a bushing assembly 70 that extends between the plates 65 and 66 and includes a suitable mounting bolt 71 that extends through longitudinal slots 72 in the plates allowing a desired amount, such as ½ inch, of longitudinal movement of the bolt 71 within the slots 72. An adjustment assembly 73 provides for longitudinal adjustment or alignment of the axle 26 by setting the longitudinal position of the bushing assembly 70. This adjustment assembly 73 may include a U-bracket 74 having holes through which the bolt 71 extends so that longitudinal movement of the U-bracket 74 will move the bolt 71 within the slots 72.

A set screw 76 is threaded through a jam nut 77 welded to the U-bracket 74 and bears against an end plate 78. The end plate 78 is welded between the plates 65 and 66 so when the set screw 76 is turned, it moves the U-bracket 74 relative to the plates 65 and 66 to adjust the longitudinal position of the bushing assembly 70. This provides an adjustment for the position of the torque beam assembly 68. When the selected position has been reached, the U-bracket 73 can be welded in place to the plates 65 and 66.

A lower beam assembly 82 is secured to the torque beam assembly 68 by two bushing assemblies 84 and 86 in a manner known in the art. The lower beam assembly 82 also serves as an axle seat having a cradle 88 formed in its upper side that is welded to the trailing axle 26.

A transverse stabilizing rod 89 extends between the hanger assemblies 62. The rod 89 is welded to the plates 65 and 66 of the hanger assembly 62 shown and to corresponding plates of a similar hanger assembly on the other side of the vehicle.

Figure 3:
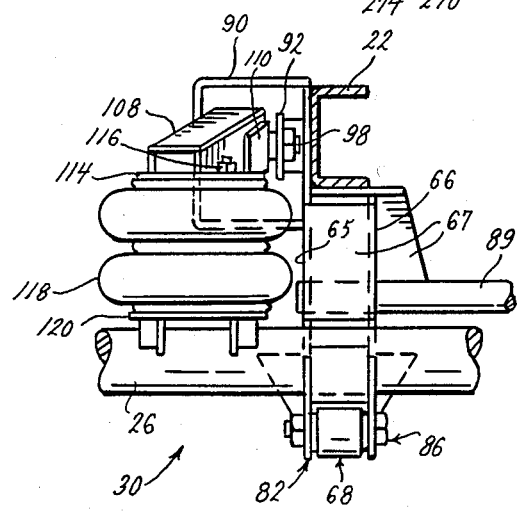
FIG. 3 is a view in section taken along the plane of the line 3—3 of FIG. 1.

The hanger assembly 62 incorporates a laterally outwardly extending U bracket 90 and an inner mounting flange 92, both welded to the plate 66, as shown in FIG. 3. A rocker arm assembly 94 is mounted on a bushing assembly 96 that is fastened by a bolt 98 between the bracket 90 and the flange 92. In order to accommodate a wide base suspension, the bushing assembly 96 is spaced laterally outwardly relative to the leaf spring assembly 34, as shown in FIG. 2.

To provide the wide base suspension, the rocker arm assembly 94 includes angled plates 100 and 102 that are connected between a rocker arm beam 104 and a bushing assembly 106. The bushing assembly 106 is journalled in the shackle 46 in a manner known in the art. The angled plates 100 and 102 displace the beam member 104 laterally outwardly relative to the leaf spring assembly 34 while maintaining those components parallel to one another and allowing the bushing assembly 96 to be transversely oriented with the rocker arm beam 104 mounted on the bushing assembly.

Rearward of the bushing assembly 96, the rocker arm assembly 94 has an angularly outwardly extending arm 108 fastened to the beam member 104 by angularly bent brackets 110 and 112. The lower side of the arm 108 is welded to an upper spring seat 114 that is fastened by bolts 116 to the top of an air spring 118. The lower side of the air spring 118 is fastened to a lower air spring seat 120. The air spring seat 120 is welded or otherwise attached to the top of the vehicle axle 26.

A particular feature of the offset created by the angled plates 100 and 102 is the resulting outboard displacement of the bushing assembly 96. As a consequence, even though the air spring 118 is further outboard, the bushing assembly 96, as viewed from above, is generally on a line between the load points at the air spring 118 and at the bushing assembly 106. Therefore, the load on the bushing assembly 96 is generally distributed in a transverse direction, thereby reducing torsional stress.

FIGS. 4 through 7 illustrate a modified suspension assembly 130 for installation on a vehicle wherein the trailing axle 131 is a four-inch drop axle (four inches below the forward drive axle). In this suspension assembly 130, it may be assumed that the forward suspension assembly is a leaf spring assembly similar to the suspension assembly 28 shown in FIG. 1 and already described, and that the rearward end of the leaf spring assembly 34 is connected by a bushing assembly 44 to a shackle 46.

For this suspension assembly 130, there is a hanger bracket assembly 132 fastened to the chassis side rail member 22, such as by bolts 134. As shown in FIG. 7, there are a pair of downwardly depending plates 136 and 138 forming part of the hanger assembly 130. The plate 136 has an inward bend to displace the plates 136 and 138 inwardly of the rail frame member 22, and as shown in FIG. 7, a plate 140 is welded to the top of the plates 136 and 138 and to the channel member 22.

A transverse bar 142 extends through the plates 136 and 138 and is welded in place. The bar 142 extends across the vehicle and is welded to the hanger assembly on the opposite side of the vehicle that corresponds to the hanger assembly 132, thereby providing lateral stability to the suspension assembly.

Because the drop axle 131 is lower to the ground, clearance must be maintained. Therefore, the suspension assembly 130 incorporates an overslung connection to the axle 131. This includes a torque beam 144 journalled on a bushing assembly 146. The bushing assembly 146 includes a bolt 148 that is mounted in a U-bracket 150 (see FIGS. 4 and 7). The bolt 148 also extends through longitudinally elongated slots 152 and 154 in the plates 136 and 138. The slots 152 and 154 allow the bushing assembly 146 to slide longitudinally, thereby adjusting the longitudinal position of the torque rod 144.

A set screw 156 is threaded into a jam nut 158 that is welded to the U-bracket 150. The set screw can be threaded to bear against an end plate 160 welded across and between the plates 136 and 138 to force the U bracket, and therefore the bushing assembly 146, to slide longitudinally. After the selected position of the bushing assembly 146 has been reached, the U bracket 150 is welded to the plates 136 and 138 to secure proper alignment of the axle 131.

Rearward of the torque beam 144, there is a beam assembly 164 fastened to the torque beam assembly 144 by bushing assemblies 166 and 168 in a manner known in the art. The beam assembly 164 includes a recessed area 170 where it is welded to the axle 132 in an overslung position.

A U-bracket 174 is welded to and extends laterally outwardly from the hanger plate 136. A vertical plate 176 is welded between the legs of the U-bracket 174 and strengthened by a lateral reinforcing plate 178. A rocker arm assembly 180 is journalled on a bushing assembly 182 that is supported between the U bracket 174 and the vertical plate 176. The rocker arm assembly 180 has a leading end 184 that is joined by way of a bushing assembly 186 to the shackle 46. At the trailing end 188 of the rocker arm assembly 180, there is an upper spring seat plate 190 fastened by bolts 192 to an air spring 194. The lower end of the air spring 194 is fastened through a lower spring seat 196 to the axle 132 by welding of the spring seat 196 to the axle. A shock absorber 198 is connected between the axle and the chassis side frame member 22 as is conventional.

In FIGS. 8, 9 and 10, another modified suspension system 210 is shown. This suspension system 210 is one incorporating a leaf spring guided forward axle 212 and an air ride rear axle 214 with a load equalizer between the axles. The suspension system includes a leaf spring suspension assembly 216 associated with the forward axle 212 and an air spring suspension assembly 218 associated with the trailing axle 214.

The forward leaf spring suspension assembly 216 includes a leaf spring assembly 220 connected by U-bolts 222 and blocks 224 and 226 to the forward axle 212 and to an axle seat 227. The forward end 228 of the leaf spring assembly bears against a wear pad 230 that extends between the side plates 232 and 234 of a hanger assembly 236. A torque rod 238 is connected by a bolt 240 to the hanger assembly 236 and by another bolt 242 to the axle seat 227 to prevent rotation of the axle 212.

The trailing end 244 of the leaf spring assembly 220 extends through a shackle 246 and bears against a wear pad 248. The spring assembly 244 has a curved stop member 250 that limits sliding movement relative to the wear pad 248 and has a hook member 258 that cooperates with a bolt 260 in the shackle 246 to limit movement of the spring relative to the shackle in the other direction.

Another hanger assembly 264 depends downwardly from the rail frame member 22. The air spring suspension assembly 218, which is similar to the one shown in U.S. Pat. No. 3,801,086, includes a torque rod 266 connected by an eccentric bolt and bushing assembly 268 to the hanger assembly 264. A beam assembly 270 is connected by bushing assemblies 272 and 274 to the torque beam 266 and is also welded to the axle 214 in an underslung fashion. The beam assembly 270 includes a lower spring seat plate 276 that is fastened to an air spring 278 by bolts 280.

According to the present invention, a rocker arm assembly 282 is pivotally mounted to the hanger assembly 264 by a bushing assembly 284. The leading end 286 of the rocker arm assembly is connected by a bushing assembly 288 to the shackle 246. Between the bushing assemblies 284 and 288, the rocker arm assembly 282 has an upwardly extending section 290 followed by a generally horizontal section 292. This arrangement avoids interference with the bushing assembly 268. Rearward of the section 292, there is a somewhat downwardly inclined section 294 leading to a trailing end 296 on which an upper spring seat 298 is welded. The upper spring seat 298 is fastened by bolts 300 to the air spring 278.

As can be seen particularly in FIG. 9, the section 294 of the rocker arm 282 is turned to an inwardly extending angle. This allows location of the air spring 278 in a position that will be free of interference with the vehicle wheel.

There may be transverse stabilizer rods 302 and 304 between the left and right hanger assemblies 236 and 264.

INSTALLATION AND OPERATION

Referring to the embodiment of FIG. 1, in a vehicle wherein the forward leaf spring suspension system 28 is to remain in place, the installation typically would include the removal of the rear hanger and the mounting of this hanger 62 from the chassis frame member 22. Then the rest of the air suspension components can be installed and the rocker arm 94 can be connected to the bushing assembly 106 on the shackle 46. The set screw 76 can be rotated to adjust the position of the bushing assembly 71 relative to the hanger 62. This moves the torque beam 68 and beam assembly 82 to adjust the longitudinal position of the axle 26. When the correct position has been attained, the U-bracket 73 can be welded to the plates 66 and 68 to fix that position. This same axle alignment for the axle 214 of the embodiment shown in FIG. 8 is achieved by rotation of the eccentric bolt assembly 268 as is known in the art.

The operation of the suspension system 20 will be apparent from what has already been described. Loads on either the forward axle 24 or the rearward axle 26, or both, will be distributed through the shackle 46 to the forward and rearward suspension assemblies 28 and 30. For example, an upward force applied by upward movement of the axle 24 will be distributed through the leaf spring assembly 34 to its ends. This force at the rearward end 44 is transferred through the shackle 46 to the rocker arm 94 and thereby transmitted to the air spring 118. Similarly, loads transmitted from the axle 26 are resisted by the air spring 118 and are also transmitted through the rocker arm 94 to the shackle 46 for distribution to the leaf spring assembly 34.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a vehicle of the kind having a chassis, a lead axle, and a trailing axle, a suspension system comprising a leaf spring assembly having first and second ends, means to support the first end of the leaf spring assembly from the chassis, means to connect the lead axle to the leaf spring assembly intermediate the ends thereof, an equalizer beam having oppositely extending first and second arms, the first arm extending angularly outwardly from the second arm to provide a spring seat spaced laterally outwardly relative to the chassis, means comprising a bushing assembly for supporting the beam between the arms thereof from the chassis while permitting rocking of the beam about the support means, an offset in the second arm to space the bushing assembly laterally outward relative to the articulated connecting means thereby locating the load on the bushing assembly closer to the center thereof, a first spring seat supported by the first arm, means to connect the trailing axle to the chassis while permitting vertical movement of the axle relative to the chassis, a second spring seat supported by the trailing axle, spring means mounted between the first and second spring seats, and articulated connecting means connected between the second end of the leaf spring assembly and the second arm, whereby a vertical force applied to either axle is resisted by both the leaf spring assembly and the spring means.

2. The suspension system of claim 1 wherein the lead axle is a drive axle.

3. The suspension system of claim 1 wherein the means to connect the trailing axle to the chassis comprises a hanger depending from the chassis and an arm pivotally connected between the hanger and the trailing axle 4. The suspension system of claim 1 wherein the articulated connecting means comprises a shackle having a first end pivotally connected to the leaf spring assembly and a second end pivotally connected to the second arm.

5. The suspension system of claim 1 wherein the spring means comprises an air spring.

6. The suspension system of claim 1 wherein the bushing assembly is generally aligned between the support means and the articulated connecting means.

7. In a vehicle of the kind having a chassis, a lead axle, and a trailing axle, a suspension system comprising a leaf spring assembly having first and second ends, means to support the first end of the leaf spring assembly from the chassis, means to connect the lead axle to the leaf spring assembly intermediate the ends thereof, an equalizer beam having oppositely extending first and second arms, means to support the beam between the arms thereof from the chassis while permitting rocking of the beam about the support means, a first spring seat supported by the first arm, means to connect the trailing axle to the chassis while permitting vertical movement of the axle relative to the chassis, a second spring seat supported by the trailing axle, spring means mounted between the first and second spring seats, and articulated connecting means connected between the second end of the leaf spring assembly and the second arm, whereby a vertical force applied to either axle is resisted by both the leaf spring assembly and the spring means, the means to connect the trailing axle to the chassis comprising a hanger extending downwardly from the chassis, a beam, means to join the beam to the trailing axle, connection means for pivotally connecting the beam to the hanger, means to adjust the longitudinal position of the connection means relative to the hanger, the connection means comprising a bushing assembly, the beam having plates on opposite sides of the bushing assembly, each plate having a longitudinal slot therethrough, the bushing assembly being mounted on a shaft the ends of which extend through the slots, means to adjust the location of the shaft in the slots and thereby relative to the hanger, and means to lock the shaft in the adjusted position relative to the hanger.

8. The suspension system of claim 7 wherein the means to adjust comprises a set screw bearing against an end of the beam, and the means to lock the shaft in the adjusted position includes plates weldable to the hanger, the shaft extending through the plates.

9. The suspension system of claim 7 wherein the lead axle is a forward axle and the trailing axle is a rear axle of a trailer, the means to support the first end of the leaf spring assembly from the chassis comprising a hanger depending from the chassis, a spring guide on the hanger to restrain the first end of the leaf spring assembly in a vertical direction while allowing longitudinal sliding movement thereof.

10. The suspension system of claim 9 including means connected between the hanger and the forward axle to restrict rotation of the forward axle.

11. The suspension system of claim 7 wherein the articulated connecting means comprises a shackle having a first end slidable on the second end of the leaf spring assembly and a second end pivotally connected to the second arm, and means to limit sliding movement of the shackle relative to the leaf spring assembly.

12. The suspension system of claim 11 wherein the second arm has a vertical offset between the beam connecting means and the connection of the shackle.

13. The suspension system of claim 7 wherein the first arm extends angularly inwardly from the second arm to provide a spring seat spaced laterally inwardly relative to the chassis.

14. A suspension system for a vehicle having a chassis and forward and rearward axles wherein the forward axle has a leaf spring suspension associated with it including leaf spring means having forward and rearward ends supported by the vehicle chassis, comprising a rocker arm having a forward end and a rearward end and having a central section of a configuration that displaces the forward end laterally relative to the rearward end with the mounting area on the central section generally aligned between the forward and rearward ends, means to replace the support for the rearward end of the leaf spring means and provide an articulated connection between the rearward end of the leaf spring means and the forward end of the rocker arm, a hanger, means to suspend the hanger from the chassis, means including the mounting area to pivotally support the rocker arm from the hanger generally distributed with the loads over the mounting means as a result of said configuration of the central section, beam means having forward and rearward ends, means to pivotally support the forward end of the beam means from the hanger, means to connect the beam means to the rearward axle, compressible spring means, means for connecting the compressible spring means between the rearward end of the rocker arm and the beam means.

15. The suspension system of claim 14 wherein the compensable spring means comprises an air spring.

16. The suspension system of claim 15 wherein the rocker arm includes a section extending upwardly to displace the rearward end of the rocker arm above the forward end.

17. The suspension system of claim 14 including a bracket extending laterally from the hanger, the means to pivotally support the rocker arm from the hanger including a bushing assembly mounted on the bracket, the rocker arm being mounted on the bushing assembly.

18. The suspension system of claim 14 wherein the leaf spring suspension is outboard of the chassis and the air spring means is outboard of the leaf spring means.

19. The suspension system of claim 15 wherein the connection of the air spring means to the beam means positions the air spring means directly above the rearward axle.

* * * * *